US010796177B1

(12) United States Patent
Yoshizaki et al.

(10) Patent No.: US 10,796,177 B1
(45) Date of Patent: Oct. 6, 2020

(54) SYSTEMS AND METHODS FOR CONTROLLING THE PLAYBACK OF VIDEO IN A VEHICLE USING TIMERS

(71) Applicant: Toyota Motor Engineering & Manufacturing North America, Inc., Plano, TX (US)

(72) Inventors: Coh L. Yoshizaki, Wixom, MI (US); John-Michael McNew, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/412,609

(22) Filed: May 15, 2019

(51) Int. Cl.
| | | |
|---|---|---|
| *B60Q 1/00* | (2006.01) | |
| *G06K 9/00* | (2006.01) | |
| *H04N 21/414* | (2011.01) | |
| *B60W 50/08* | (2020.01) | |
| *B60W 50/14* | (2020.01) | |
| *B60R 1/00* | (2006.01) | |

(52) U.S. Cl.
CPC ............ *G06K 9/00845* (2013.01); *B60R 1/00* (2013.01); *B60W 50/087* (2013.01); *B60W 50/14* (2013.01); *H04N 21/41422* (2013.01); *B60R 2300/20* (2013.01)

(58) Field of Classification Search
CPC .. G06K 9/00845; B60R 1/00; B60R 2300/20; B60W 50/087; B60W 50/14; H04N 21/41422
USPC ........................................................ 340/461
See application file for complete search history.

(56) References Cited

U.S. PATENT DOCUMENTS

| | | | | |
|---|---|---|---|---|
| 5,474,453 A | * | 12/1995 | Copperman | ............ A63F 13/10 434/29 |
| 5,541,572 A | * | 7/1996 | Okamoto | ................. H04N 5/44 340/428 |
| 6,670,984 B1 | * | 12/2003 | Tanaka | .................... H04N 7/181 348/14.1 |
| 8,624,716 B2 | * | 1/2014 | Englander | ................ B60O 1/24 340/433 |
| 10,507,798 B1 | * | 12/2019 | Sebastian | ................ B60R 25/23 |
| 2003/0137586 A1 | * | 7/2003 | Lewellen | ............... H04N 7/181 348/148 |
| 2004/0252193 A1 | * | 12/2004 | Higgins | ............... G08G 1/0175 348/149 |
| 2007/0239357 A1 | * | 10/2007 | Mori | .................... B62D 15/027 701/469 |

(Continued)

*Primary Examiner* — Kerri L McNally
*Assistant Examiner* — Thang D Tran
(74) *Attorney, Agent, or Firm* — Christopher G. Darrow; Darrow Mustafa PC (57) ABSTRACT

A safety system can play videos in a vehicle while minimizing driver distraction. The driver can select a video source, and video from the video source may begin playing on a display to the driver. Upon the driver first selecting the video, the video is displayed to the driver for an amount of time that does not exceed a timer having a duration. If the driver again selects to view the video, the duration associated with the timer is reduced, and the video is displayed for an amount of time that does not exceed the newly reduced timer. As the driver continues to try to view the video, the duration of the timer is further reduced until it is zero or near zero. After which the driver may not be permitted to view the video until a threshold amount of time has passed.

21 Claims, 6 Drawing Sheets

(56) References Cited

U.S. PATENT DOCUMENTS

| | | | |
|---|---|---|---|
| 2008/0222613 A1* | 9/2008 | Allen | G06F 16/335 717/128 |
| 2008/0267015 A1* | 10/2008 | Zhang | G04G 15/006 368/10 |
| 2009/0080328 A1* | 3/2009 | Hu | H04L 65/4084 370/230 |
| 2009/0231158 A1* | 9/2009 | Grigsby | G08G 1/0962 340/902 |
| 2009/0231432 A1 | 9/2009 | Grigsy et al. | |
| 2010/0053480 A1* | 3/2010 | Jaworski | B60R 11/0235 348/837 |
| 2010/0142725 A1* | 6/2010 | Goldstein | G01H 3/14 381/92 |
| 2010/0194549 A1* | 8/2010 | Tonokawa | B60R 1/00 340/425.5 |
| 2010/0247067 A1* | 9/2010 | Gratton | H04N 5/76 386/291 |
| 2012/0215403 A1* | 8/2012 | Tengler | B60K 35/00 701/36 |
| 2013/0005261 A1* | 1/2013 | Yamanaka | H04L 67/12 455/41.2 |
| 2014/0309806 A1* | 10/2014 | Ricci | H04W 12/0808 701/1 |
| 2014/0323048 A1* | 10/2014 | Kang | H04W 4/80 455/41.2 |
| 2014/0368653 A1* | 12/2014 | Wang | H04N 1/00209 348/148 |
| 2016/0082888 A1* | 3/2016 | Kothari | B60R 1/00 348/148 |
| 2017/0072850 A1* | 3/2017 | Curtis | B60W 50/14 |
| 2017/0178601 A1* | 6/2017 | Bloch | G09G 5/395 |
| 2017/0193101 A1* | 7/2017 | Sharma | G06F 16/639 |
| 2017/0225691 A1* | 8/2017 | Yamada | B60W 10/04 |
| 2017/0305365 A1* | 10/2017 | Matsumoto | B60R 1/00 |
| 2017/0313248 A1* | 11/2017 | Kothari | B60K 35/00 |
| 2018/0111552 A1* | 4/2018 | Neiswander | B60W 40/09 |
| 2018/0166047 A1* | 6/2018 | Yamazato | G09G 3/002 |
| 2019/0116240 A1* | 4/2019 | Iyer | H04L 67/2857 |
| 2019/0315376 A1* | 10/2019 | Seo | B60W 50/082 |

* cited by examiner

SYSTEMS AND METHODS FOR CONTROLLING THE PLAYBACK OF VIDEO IN A VEHICLE USING TIMERS

TECHNICAL FIELD

The subject matter described herein relates, in general, to systems and methods for playing video in a vehicle, and, in particular, to controlling the playing of video in a vehicle using a timer that is reduced for each successive video playback.

BACKGROUND

Cameras on vehicles are quickly becoming a standard feature. These cameras allow a driver to view a video stream provided by the camera on a display typically found in the console of the vehicle. The video streams provided by the cameras may allow for the driver to view areas surrounding the vehicle that may be difficult or impossible for the driver to otherwise view. Examples of cameras include a rear view camera that provides a rear view of the vehicle including a bumper of the vehicle, and side view cameras that provide side views of the vehicle that include views otherwise obscured by blind spots associated with the vehicle.

While cameras provide useful information, their use is currently restricted in most vehicles. With respect to rear view cameras, these cameras are only activated when the vehicle is in reverse and otherwise not available for the driver to view. With respect to side view cameras, these cameras are only activated when the user activates a turn signal associated with the vehicle.

The reasoning behind restricting camera viewing is that were a video from cameras be made available at all times, the drivers would become distracted and more prone to having accidents. Therefore, what is needed is way to allow for the use of cameras by drivers, while still ensuring that drivers stay focused on driving and the road ahead.

SUMMARY

In one embodiment, a safety system for playing videos in a vehicle while minimizing driver distraction is provided. Cameras, and other video sources, available on a vehicle are detected and displayed to a driver on a display. The driver can select a video source, and video from the video source may begin playing on the display to the driver. Upon the driver first selecting the video, the video is displayed to the driver for an amount of time that does not exceed a timer having a duration. The duration may be selected based on research or knowledge about what is considered an acceptable or safe amount of distraction for a driver. If the driver again selects to view the video, the duration associated with the timer is reduced, and the video is displayed to the driver for an amount of time that does not exceed the newly reduced timer. As the driver continues to try to view the video, the duration of the timer is further reduced until it is zero or near zero. After which the driver may not be permitted to view the video until a threshold amount of time has passed.

As will be described further below, the safety system solves many of the problems associated with viewing videos in a vehicle. First, because the amount of time that the driver can view the video while driving is reduced at each successive playback, the total amount of time that driver can be continuously distracted by the video is fixed. Second, because the driver knows that the amount of time that the video is displayed is reduced for each viewing, the driver is discouraged from repeatedly trying to view the video.

In one embodiment, a system for playing video in a vehicle is provided. The system includes one or more processors and a memory communicably coupled to the one or more processors and storing a video module. The video module includes instructions that when executed by the one or more processors cause the one or more processors to: receive a first request to play video on a display inside of a vehicle; in response to the first request, play the video on the display inside of the vehicle; start a first timer having a first duration; determine that the first timer has expired; in response to determining that the first timer has expired, stop the video from playing on the display inside of the vehicle; receive a second request to play the video on the display inside of the vehicle; in response to the second request, play the video on the display inside of the vehicle; start a second timer having a second duration; determine that the second timer has expired; and in response to determining that the second timer has expired, stop the video from playing on the display inside of the vehicle.

Implementations may include some or all of the following features. The video module may further includes instructions that when executed by the one or more processors cause the one or more processors to: receive a third request to play the video on the display inside of the vehicle; in response to the third request, reject the third request to play the video on the display inside of the vehicle. The video module may further include instructions that when executed by the one or more processors cause the one or more processors to: display an indication that the video cannot be played. The first duration may be greater than the second duration. The video module may further includes instructions that when executed by the one or more processors cause the one or more processors to: determine a speed of the vehicle; determine that the speed is greater than a threshold speed; and start the first timer and second timer only when the determined speed is greater than the threshold speed. The video may be streamed from a camera associated with the vehicle. The video module may further include instructions that when executed by the one or more processors cause the one or more processors to: receive a selection of a camera of a plurality of cameras associated with the vehicle; and play video associated with the selected camera on the display inside of the vehicle. The video module may further includes instructions that when executed by the one or more processors cause the one or more processors to: determine a default camera of a plurality of cameras associated with the vehicle; and play video associated with the default camera on the display inside of the vehicle.

In one embodiment, a method for playing video in a vehicle is provided. The method includes: receiving a first request to play video on a display inside of a vehicle; in response to the first request, playing the video on the display inside of the vehicle; starting a first timer having a first duration; determining that the first timer has expired; in response to determining that the first timer has expired, stopping the video from playing on the display inside of the vehicle; receiving a second request to play the video on the display inside of the vehicle; in response to the second request, playing the video on the display inside of the vehicle; starting a second timer having a second duration; determining that the second timer has expired; and in response to determining that the second timer has expired, stopping the video from playing on the display inside of the vehicle.

Implementations may include some or all of the following features. The method may further include: receiving a third request to play the video on the display inside of the vehicle; in response to the third request, rejecting the third request to play the video on the display inside of the vehicle. The method may further include displaying an indication that the video cannot be played. The first duration may be greater than the second duration. The method may further include determining a speed of the vehicle; determining that the speed is greater than a threshold speed; and starting the first timer and second timer only when the determined speed is greater than the threshold speed. The video is streamed from a camera associated with the vehicle. The method may further include receiving a selection of a camera of a plurality of cameras associated with the vehicle, and playing video associated with the selected camera on the display inside of the vehicle. The method may further include: determining a default camera of a plurality of cameras associated with the vehicle; and playing video associated with the default camera on the display associated with the vehicle. The method may further include: determining a speed of the vehicle; and setting the first duration based on the determined speed.

In one embodiment, a non-transitory computer-readable medium for playing video in a vehicle is provided. The medium instructions that when executed by one or more processors cause the one or more processors to: receive a first request to play video on a display inside of a vehicle; in response to the first request, play the video on the display inside of the vehicle; start a first timer having a first duration; determine that the first timer has expired; in response to determining that the first timer has expired, stop the video from playing on the display inside of the vehicle; receive a second request to play the video on the display inside of the vehicle; in response to the second request, play the video on the display inside of the vehicle; start a second timer having a second duration; determine that the second timer has expired; and in response to determining that the second timer has expired, stop the video from playing on the display inside of the vehicle.

Implementations may include some or all of the following features. The medium may further include instructions that when executed by one or more processors cause the one or more processors to: receive a third request to play the video on the display inside of the vehicle; in response to the third request, reject the third request to play the video on the display inside of the vehicle. The first duration may be greater than the second duration.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
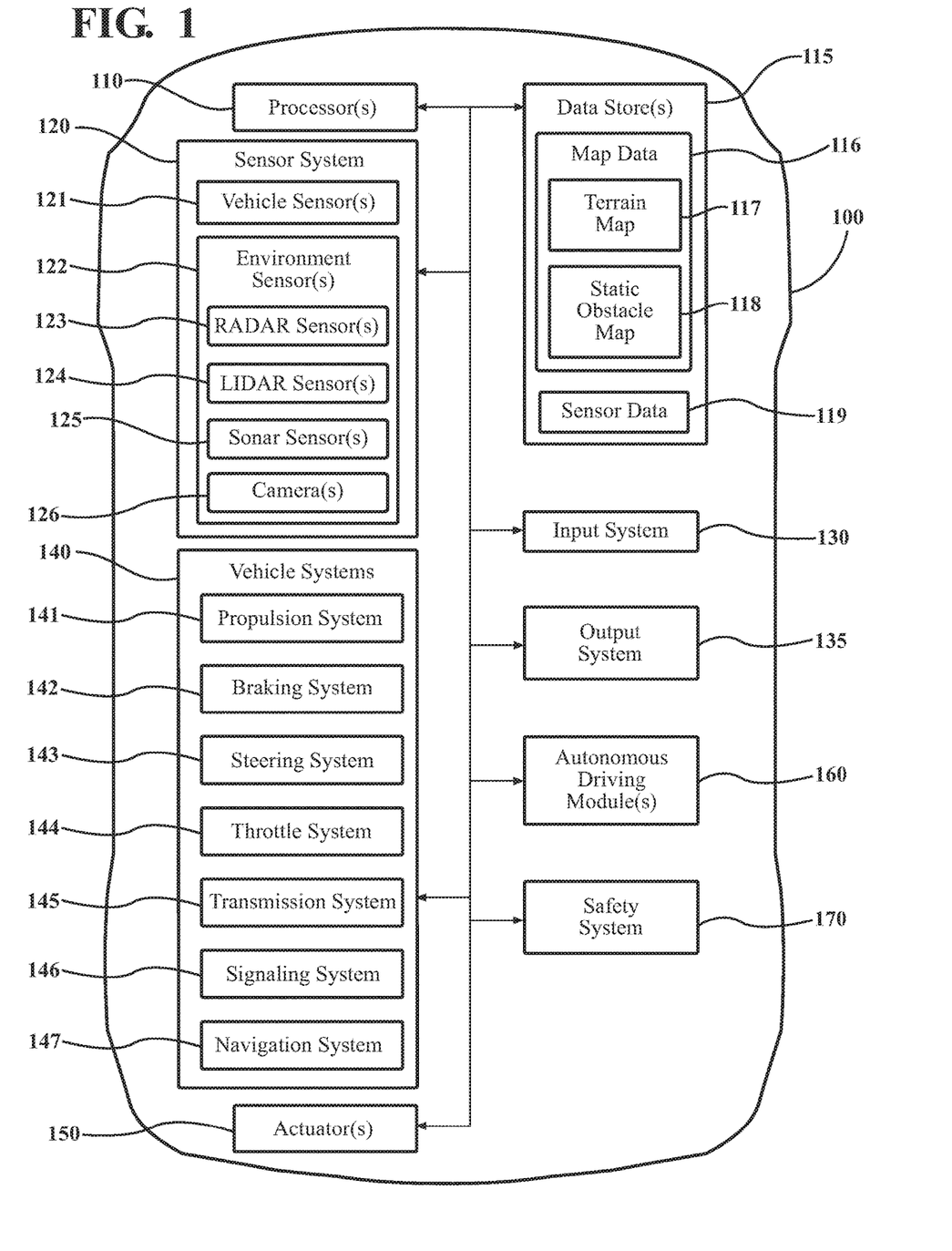
FIG. 1 illustrates one embodiment of a vehicle within which systems and methods disclosed herein may be implemented.

With regards to FIG. 1, a vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes the safety system 170 that is implemented to enable or disable the playing of video on a display of the vehicle 100 based on one or more timers. The noted functions and methods will become more apparent with a further discussion of the figures.

Figure 2:
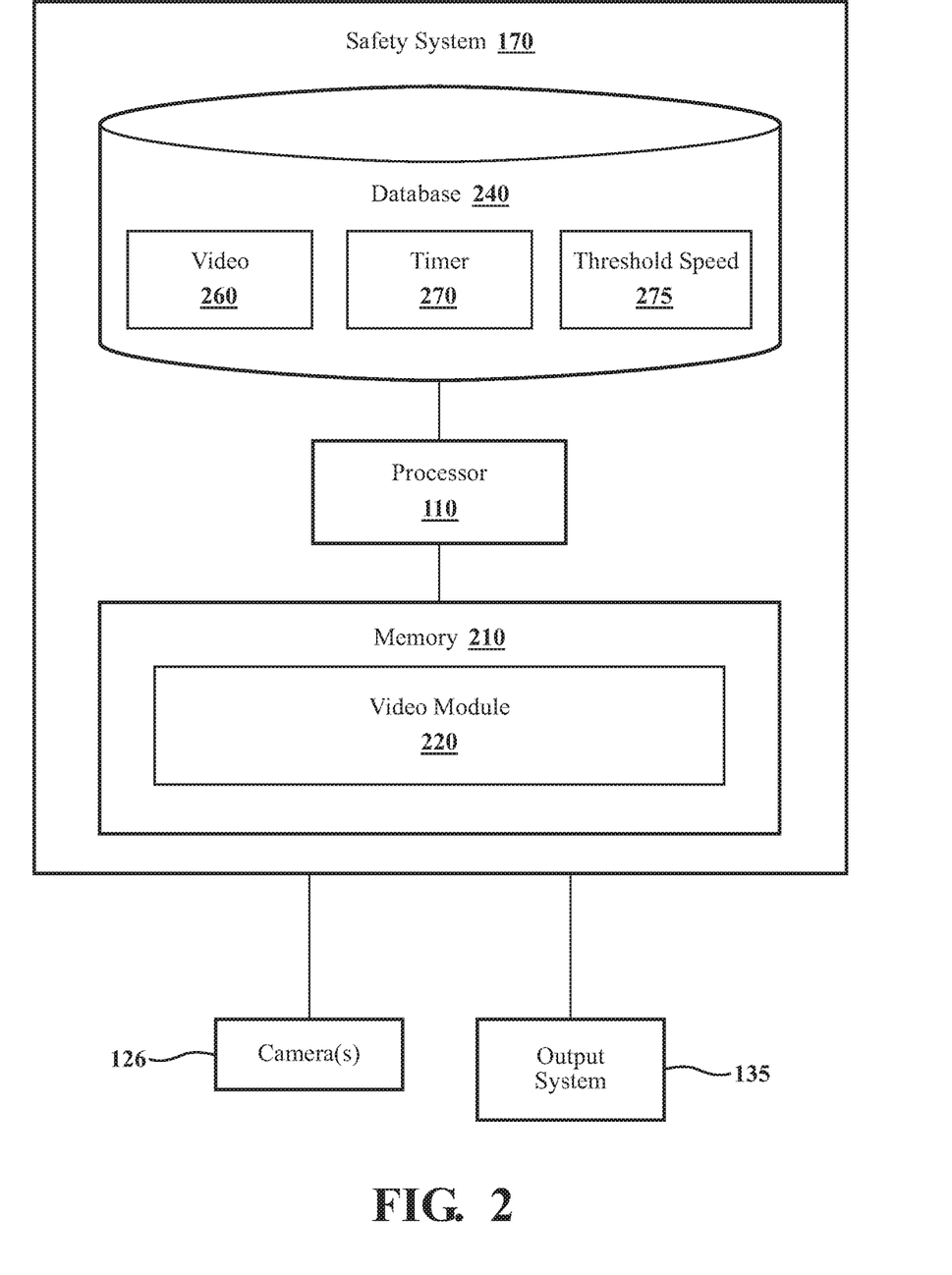
FIG. 2 illustrates one embodiment of a safety system.

With reference to FIG. 2, one embodiment of the safety system 170 of FIG. 1 is further illustrated. The safety system 170 is shown as including a processor 110 from the vehicle 100 of FIG. 1. Accordingly, the process or 110 may be a part of the safety system 170, the safety system 170 may include a separate processor from the processor 110 of the vehicle 100, or the safety system 170 may access the processor 110 through a data bus or another communication path. It should be appreciated, that while the safety system 170 is illustrated as being a single contained system, in various embodiments, the safety system 170 is a distributed system that is comprised of components that can be provided as a centralized server, a cloud-based service, and so on.

In one embodiment, the safety system 170 includes a memory 210 that stores a video module 220. The memory 210 is a random-access memory (RAM), read-only memory (ROM), a hard-disk drive, a flash memory, or other suitable memory for storing the video module 220. The video module 220 is, for example, computer-readable instructions that when executed by the processor 110 cause the processor 110 to perform the various functions disclosed herein. Moreover, as previously noted, in various embodiments, one or more aspects of the safety system 170 are implemented as cloud-based services, and so on. Thus, one or more modules of the safety system 170 may be located remotely from other components and may be implemented in a distributed manner.

Furthermore, in one embodiment, the safety system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the video module 220 in executing various functions. In one embodiment, the database 240 includes a video 260 along with, for example, other information that is used and/or generated by the video module 220 such as a timer 270 and a threshold speed 275. Of course, in further embodiments, the various information may be stored within the memory 210 or another suitable location.

The video module 220 is configured to display a video inside of a vehicle 100. The video module 220 may display the video 260 through the output system 135 of the vehicle 100. The output system 135 may include a display arranged inside of the vehicle 100. Depending on the embodiment, the display may be integrated into the vehicle 100 such as the dashboard or console of the vehicle 100. The display may be an LCD display, however other display technologies may be used.

The video 260 may be a video stream, and may be received from one or more cameras 126 associated with the vehicle 100. The cameras 126 may include rear view cameras (i.e., backup camera), side cameras, etc. Note that the video 260 is not limited to video streams received from cameras 126, but may include any form of video such as recorded video (e.g., video stored on a DVD, hard drive, or other storage device), or broadcast video (e.g., video received from an over-the-air television broadcast). Other types of video may be displayed.

The video module 220 may be configured to detect the cameras 126 associated with a vehicle 100, and may display indicators of the cameras 126 to the driver of the vehicle 100 on the display of the output system 135. The driver may then select the camera 126 whose video 260 that they would like to view on the display. The video module 220 may then cause the video 260 from the selected camera to be displayed on the display of the output system 135. The driver may be able to adjust the video 260 (e.g., change zoom level, change picture settings, or change viewing angle) using controls provided by the video module 220.

In some embodiments, when the driver indicates that they would like to view a video 260 by pressing a button associated with the display, initially video 260 from a default camera 126 may be displayed. The driver may then choose a different camera 126 if desired using controls provide by the video module 220. The default camera 126 may be set by the driver, or may be the last camera 126 that was viewed by the driver in a previous session. Similarly, the video 260 from the default camera 126 may be shown with any settings or adjustments made by the driver during the previous viewing session.

The video module 220 may control the playback of the video 260 using one or more timers 270. In one embodiment, when a video 260 begins playing on the display of the vehicle 100, the video module 220 may start a timer 270. When the timer 270 reaches zero, or otherwise expires, the video module 220 may stop the video 260 from playing. The duration of the timer 270 may be set by a user or administrator and may be set based on current research or knowledge regarding driver distraction. An example duration may be 5 seconds. Other durations may be used.

In some implementations, the duration of the timer 270 may be dynamic and may be set by the video module 220 based on a variety of factors. The factors may include vehicle speed (e.g., higher vehicle speed equals shorter durations), driver age (e.g., very old and very young drivers may be given shorter durations), driver history (e.g., a driver with a history of tickets or accidents may receive a shorter duration while a driver with no history of tickets or accidents may receive a longer duration), time of day (e.g., shorter durations may be used at night than during the day), weather conditions (e.g., during snow or rain shorter durations may be used), and traffic conditions (e.g., shorter durations may be used when traffic conditions are poor). Other factors may be used to set the duration of the timer 270.

In some embodiments, the video module 220 may use the timer 270 when the vehicle 100 is traveling above a threshold speed 275. As may be appreciated, when the vehicle 100 is traveling at a slow speed, the risk of an accident due to driver distraction is low. Accordingly when the vehicle 100 is traveling below the threshold speed 275, the video module 220 may allow the video 260 to play in the vehicle 100 without using a timer 270. The threshold speed 275 may be set by a user or administrator. Example threshold speeds 275 include 0 mph, 5 mph, 10 mph, etc.

The video module 220 may be further configured, after the timer 270 expires and playback of the video 260 is stopped, to reduce the duration of the timer 270. When the driver later requests to again play the video 260, the video module 220 may use the timer 270 with the reduced duration to control playback of the video 260 in the vehicle 100. The video module 220 may continue to reduce the duration of the timer 270 with each successive playback of the video 260 until no time remains on the timer 270 (or the duration of the timer 270 falls below a threshold). After which, the video module 220 may display a message or other indication to the driver that no further playback of video 260 in the vehicle 100 is permitted. Note that depending on the embodiment, playback of the video 260 may only be restricted by the video module 220 when the speed of the vehicle 100 is greater than the threshold speed 275.

After each viewing of the video 260, the video module 220 may reduce the duration of the timer 270. In some embodiments, the amount that the timer 270 is reduced by is fixed (e.g., 2 seconds, 3 seconds, or 4 seconds). In other implementations, the amount may vary. For example, after the first time the video is played, the video module 220 may reduce the duration of the timer 270 by one second, and after the second time that the video is played, the video module 220 may reduce the duration of the timer 270 by three seconds. The amount that the timer 270 is reduced by after each viewing may be set by a user or administrator.

In some implementations, the video module 220 may reduce the duration of the timer 270 for each viewing of the video 260. Alternatively, the video module 220 may reduce the timer 270 only when successive viewings of the video 260 are close together or within a threshold time. For example, the video module 220 may only reduce the timer 270 between successive viewings of the video 260 if the driver did not wait at least five minutes between viewings. The threshold time may be set by a user or administrator.

In some embodiments, the video module 220 may restore the timer 270 to its original duration, or add time back to the timer 270, when certain conditions are met. For example, if the driver of the vehicle 100 does not play the video 260 for more than a threshold time such as 3 minutes, 5 minutes, etc. The threshold time may be set by a user or administrator.

After the timer 270 expires, and either the duration of the timer 270 is zero or falls below a threshold, the video module 220 may prevent the driver from viewing any more videos 260 in the vehicle 100. Depending on the embodiment, the video module 220 may prevent viewing of the video 260 for some period of time (e.g., 10 minutes, 30 minutes, 1 hour, or 2 hours). The period of time may be set by a user or administrator.

Figure 3:
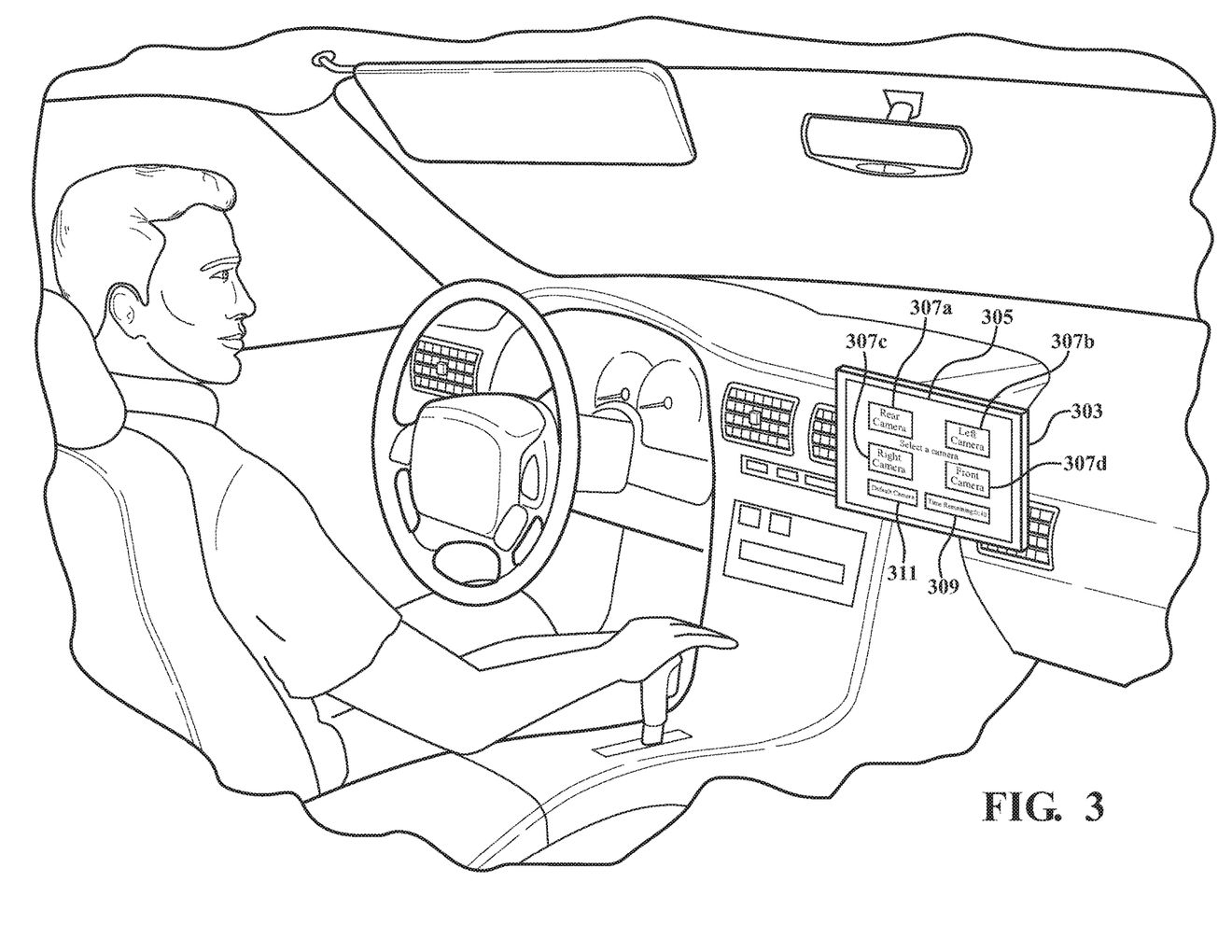
FIG. 3 illustrates an example environment implementing a safety system.

FIG. 3 illustrated an example environment implementing one embodiment of a safety system 170. As shown, a driver is driving a vehicle 100. The vehicle 100 includes a display 303 that is displaying a user-interface 305. The user-interface 305 may be touch interface that the driver can use to select video 260 from one or more cameras 126. In the example shown, the user-interface 305 includes a plurality of user-interface elements 307 that the driver can select to display video 260 from each of a plurality of different cameras 126. The user-interface element 307a labeled "Rear Camera" may be selected by the driver to view video 260 streamed from a rear camera of the vehicle 100. The user-interface element 307b labeled "Left Camera" may be selected by the driver to view video 260 streamed from a left-side camera of the vehicle 100. The user-interface element 307c labeled "Right Camera" may be selected by the driver to view video 260 streamed from a right-side camera of the vehicle 100. The user-interface element 307d labeled "Front Camera" may be selected by the driver to view video 260 streamed from a front camera of the vehicle 100. When the driver started the vehicle 100, the video module 220 may have automatically detected each of the cameras 126 associated with the vehicle 100 and generated and displayed a user-interface element 307 corresponding to each detected camera 126.

The user-interface 305 also includes a user-interface element 311 labeled "Default Camera" that may be selected by the driver to view video 260 associated with the default camera 126. Depending on the embodiment, the default camera 126 may be the camera 126 whose video 260 was most recently viewed or selected by the driver of the vehicle 100. Alternatively, the driver of the vehicle 100 may have explicitly designated a particular camera 126 as the default camera 126. When the video 260 from the default camera 126 is played in the user-interface 305 it may be displayed using default settings such as zoom level, contrast, viewing angle, etc. Other camera settings may be supported.

Also shown in the user-interface 305 is a user-interface element 309 labeled "Time Remaining." The user-interface element 309 may display the duration of the timer 270. In the example shown, the user-interface element 309 displays "0:10" indicating that the duration of the timer 270 is 10 seconds. After the driver selects to view video 260 corresponding to any of the user-interface elements 307 or 311, the user-interface element 309 may begin to count down the timer 270 as the selected video is played in the user-interface 305.

Figure 4:
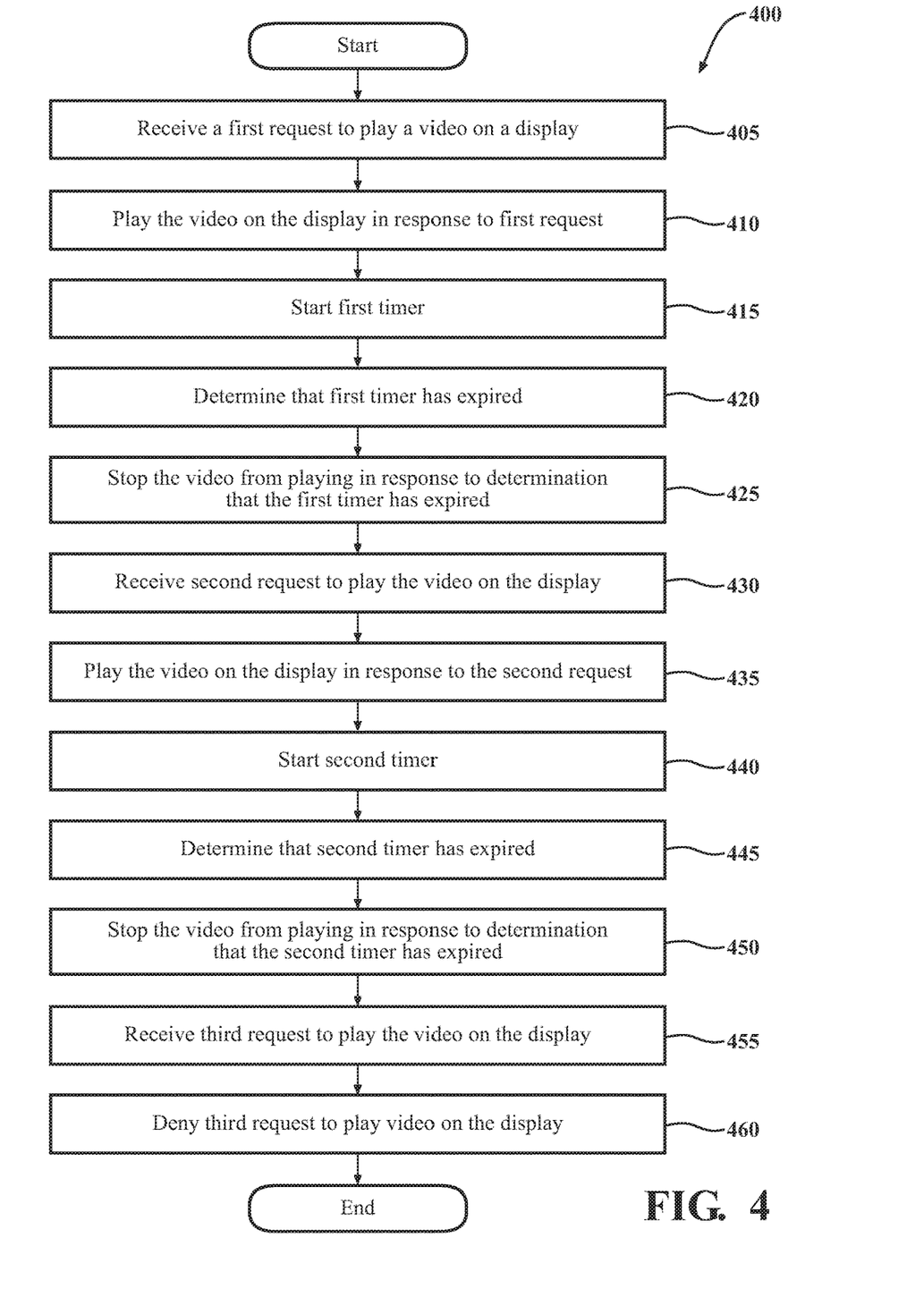
FIG. 4 illustrates a flowchart of a method that is associated with controlling video playback using timers.

Additional aspects of vehicle safety will be discussed in relation to FIG. 4. FIG. 4 illustrates a flowchart of a method 400 that is associated with controlling the display of a video 260 using a timer 270. The method 400 will be discussed from the perspective of the safety system 170 of FIGS. 1 and 2. While the method 400 is discussed in combination with the safety system 170, it should be appreciated that the method 400 is not limited to being implemented within the safety system 170 but is instead one example of a system that may implement the method 400.

At 405, the video module 220 receives a first request to play a video 260 on a display. The display may be located inside of a vehicle 100. The video 260 may be a video stream from a camera 126 associated with the vehicle 100. The vehicle 100 may be moving more than a threshold speed 275 when the request is received.

At 410, the video module 220 plays the video 260 on the display of the vehicle 100. The video module 220 may play the video 260 in response to the first request.

At 415, the video module 220 starts the first timer 270. The first timer may have a first duration. The first timer 270 may count down towards zero, or may count up towards some maximum value. The first timer 270 may run while the video module 220 plays the video 260.

At 420, the video module 220 determines that the first timer 270 has expired. The first timer 270 may expire when the associated first duration of time has passed since the first timer 270 was started.

At 425, the video module 220 stops the video 260 from playing on the display of the vehicle 100. The video module 220 may stop the video 260 from playing in response to determining that the first timer 270 has expired.

At 430, the video module 220 receives a second request to play the video 260 on the display of the vehicle 100. The second request may be received from the driver and may be received soon after the video 260 was stopped by the video module 220.

At 435, the video module 220 plays the video 260 on the display of the vehicle 100. The video module 220 may play the video 260 in response to the second request.

At 440, the video module 220 starts the second timer 270. The second timer may have a second duration. The second timer 270 may count down towards zero, or may count up towards some maximum value. The second timer 270 may run while the video module 220 plays the video 260. The second duration may be less than the first duration.

At 445, the video module 220 determines that the second timer 270 has expired. The second timer 270 may expire when the associated second duration of time has passed since the second timer 270 was started.

At 450, the video module 220 stops the video 260 from playing on the display of the vehicle 100. The video module 220 may stop the video 260 from playing in response to determining that the second timer 270 has expired.

At 455, the video module 220 receives a third request to play the video 260 on the display of the vehicle 100. The third request may be received from the driver and may be received soon after the video 260 was stopped by the video module 220.

At 460, the video module 220 denies the third request to play the video 260 on the display of the vehicle 100. Depending on the embodiment, the video module 220 may deny the third request because the duration of a third timer 270 may be zero or may be below a threshold duration. After denying the third request to play the video 260, the video module 220 may display a message to the driver that video playback has been disabled due to excessive usage.

Figure 5:
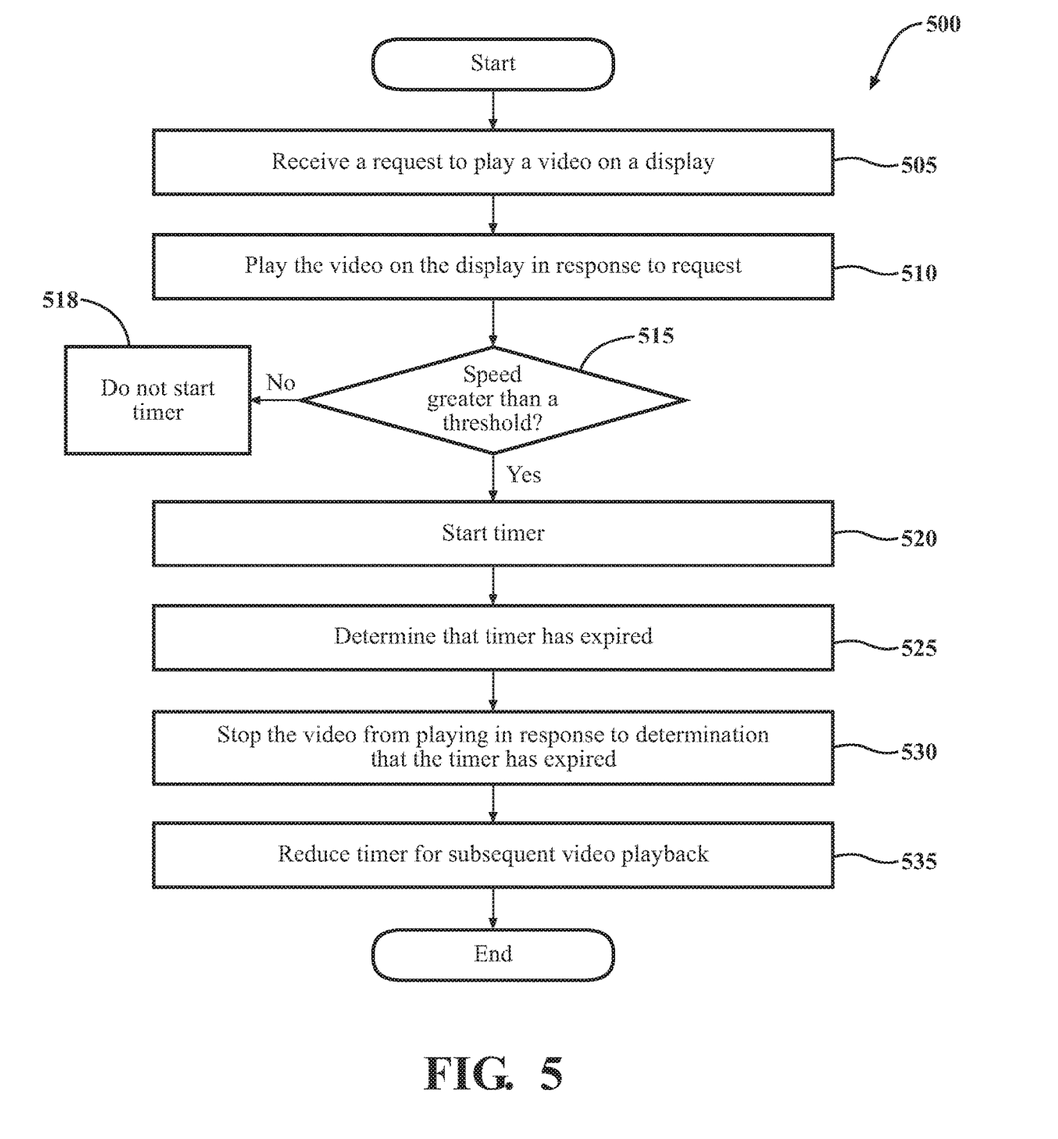
FIG. 5 illustrates a flowchart of a method that is associated with controlling video playback using timers.

Additional aspects of vehicle safety will be discussed in relation to FIG. 5. FIG. 5 illustrates a flowchart of a method 500 that is associated with controlling the display of a video 260 using a timer 270. The method 500 will be discussed from the perspective of the safety system 170 of FIGS. 1 and 2. While the method 500 is discussed in combination with the safety system 170, it should be appreciated that the method 500 is not limited to being implemented within the safety system 170 but is instead one example of a system that may implement the method 500.

At 505, the video module 220 receives a request to play a video 260 on a display. The display may be a display inside of the vehicle 100. The video 260 may be video 260 streamed from a camera 126 associated with the vehicle 100, or may be a movie or television program. Other types of videos 260 may be supported.

At 510, the video module 220 plays the video 260 on the display of the vehicle 100. The video module 220 may play the video 260 in response to the request.

At the 515, the video module 220 determines whether the speed of the vehicle 100 is greater than a threshold speed 275. The video module 220 may determine the current speed of the vehicle 100 by communicating with one or more vehicle systems 140 such as the propulsion system 141, the throttle system 144, or the navigation system 147. If the speed is not greater than the threshold speed 275, then the method 500 ends at 518 where the video is allowed to play without the use of the timer 270. As may be appreciated, because the vehicle 100 is traveling slow (i.e., less than the threshold speed 275) there may be less risk of accident if the driver is allowed to view the video 260. If the speed is greater than the threshold speed 275, then the method 500 may continue at 520.

At 520, the video module 220 starts the timer 270. The timer 270 may have a duration. The timer 270 may count down towards zero, or may count up towards some maximum value. The timer 270 may run while the video module 220 plays the video 260.

At 525, the video module 220 determines that the timer 270 has expired. The timer 270 may expire when the associated duration of time has passed since the timer 270 was started.

At 530, the video module 220 stops the video 260 from playing on the display of the vehicle 100. The video module 220 may stop the video 260 from playing in response to determining that the timer 270 has expired.

At 535, the video module 220 reduces the timer 270 for subsequent video 260 playback. The timer 270 may be reduced by deducing the duration associated with the timer 270. If the driver again requests to view the video 260, the video module 220 may allow the video 260 to play in the vehicle 100 using the shortened timer 270. As may be appreciated, the timer 270 may be repeatedly shortened for subsequent viewings of the video 260 until playback of the video 260 is disabled by the video module 220.

Figure 6:
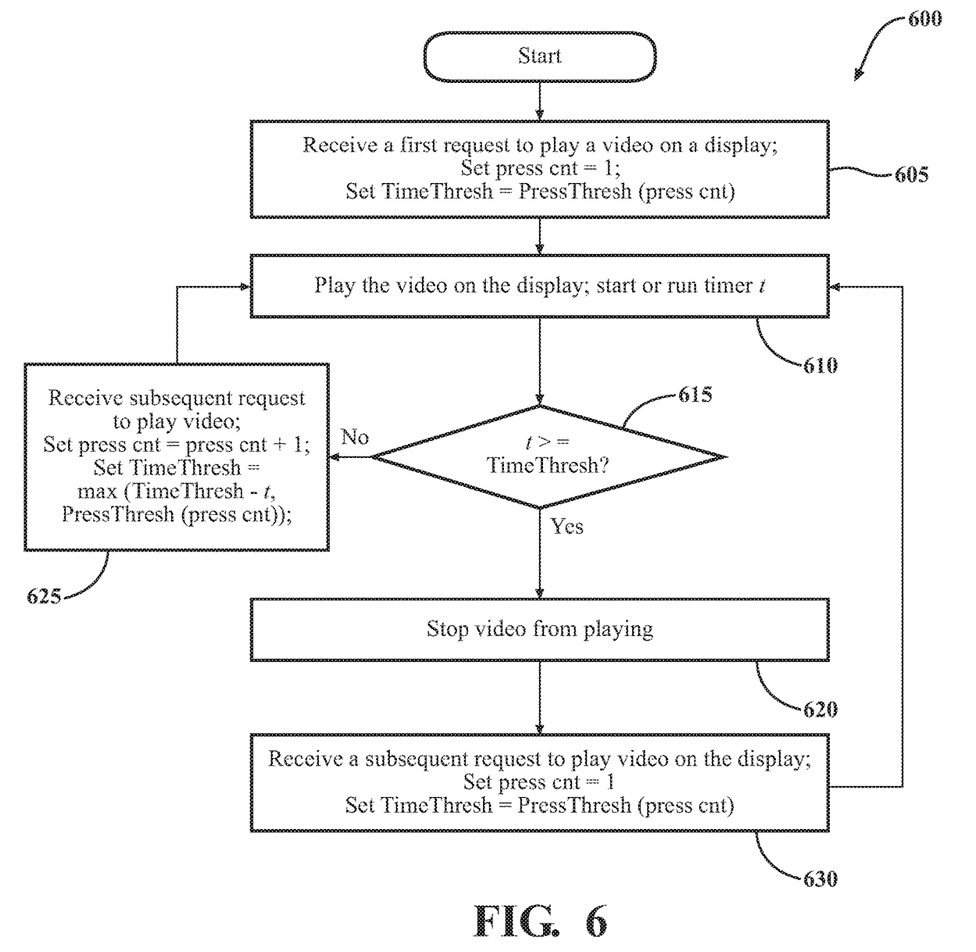
FIG. 6 illustrates a flowchart of a method that is associated with controlling the display of a video 260 in a vehicle.

Additional aspects of vehicle safety will be discussed in relation to FIG. 6. FIG. 6 illustrates a flowchart of a method 600 that is associated with controlling the display of a video 260 in a vehicle 100. The method 600 will be discussed from the perspective of the safety system 170 of FIGS. 1 and 2. While the method 600 is discussed in combination with the safety system 170, it should be appreciated that the method 600 is not limited to being implemented within the safety system 170 but is instead one example of a system that may implement the method 500.

At 605, the video module 220 receives a request to play a video 260 on a display. The display may be a display inside of the vehicle 100. The video 260 may be video 260 streamed from a camera 126 associated with the vehicle 100, or may be a movie or television program. Other types of videos 260 may be supported.

The request may be the first request received to play a video 260, and may be received in response to a driver of the vehicle 100. In response to the request, the video module 220 may set the value of a variable called press_cnt equal to 1 (i.e., set press_cnt=1). The variable press_cnt may be used to keep track of the number of times that the driver has requested to play any video 260 on the display of the vehicle 100.

In addition, the video module 220 may further set a value of a variable called TimeThresh that may control the maximum amount of time that a video 260 may be played. In one implementation, TimeThresh may be set using a function called PressThresh on the value of press_cnt (i.e., set TimeThresh=PressThresh(press_cnt)). The function PressThresh may return a value for TimeThresh based on the value of press_cnt according to the following table:

| press_cnt | TimeThresh |
| --- | --- |
| 1 | 10 |
| 2 | 5 |
| 3 | 3 |
| 4 | 0 |

As can be seen from the table, the maximum time (i.e., TimeThresh) that the driver can view a video 260 decreases each time the user views the same or different video 260. In addition, the driver is limited to at most four viewings of a video 260. Note that the number and values of press_cnt and TimeThresh shown above are for illustration only and can be set by a user or administrator.

At 610, the video module 220 plays the video 260 on the display of the vehicle 100. The video module 220 may play the video 260 in response to the first request. In addition, the video module 220 may start a timer 260 $t$. The timer 260 $t$ may count upward from 0. Other values may be used.

At 615, the video module 220 determines whether the timer 260 $t$ is greater than or equal to TimeThresh. If so, the method 600 may continue to 620 where the video 260 is stopped from playing. Else, the method 600 may return to 610 and the video may continue to play and the timer 260 $t$ may continue to run.

At 620, the video module 220 stops the video 260 from playing on the display of the vehicle 100. The video module 220 may stop the video 260 from playing in response to determining that the timer 260 $t$ was greater than or equal to TimeThresh.

At 625, while the timer 260 $t$ is not greater than or equal to TimeThresh, the video module 220 may receive another request to play a video 260. The video 260 may be a different video 260 than the video 260 requested at 605. In response to the another request, the video module 220 may increment the value of press_cnt by 1 to reflect the new request (i.e., set press_cnt=press_cnt+1). In addition, the video module 220 may set the value of TimeThresh to the greater of the amount of time left until the timer 260 $t$ reaches the current value of TimeThresh, or the next value of TimeThresh given the change to press_cnt (i.e., set TimeThresh=max (TimeThresh−t, PressThresh(press_cnt))). The method 600 may then continue at 610.

At 630, after the video 260 was stopped because the timer 260 $t$ was greater than or equal to TimeThresh, the video module 220 may receive another request to play a video 260. The video 260 may be a different video 260 than the first video 260 requested at 605 or may be the same request. In response to the another request, the video module 220 may set press_cnt to 1 (i.e., set press_cnt=1). In addition, the video module 220 may set the value of TimeThresh to the next value of TimeThresh given the change to press_cnt (i.e., set TimeThresh=PressThresh(press_cnt)). The method 600 may then continue at 610.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the safety system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the safety system 170, and/or the autonomous driving module(s) 160 may control some or all of these vehicle systems 140 and, thus, may be partially or fully autonomous.

The processor(s) 110, the safety system 170, and/or the autonomous driving module(s) 160 can be operatively connected to communicate with the various vehicle systems 140 and/or individual components thereof. For example, returning to FIG. 1, the processor(s) 110, the safety system 170, and/or the autonomous driving module(s) 160 can be in communication to send and/or receive information from the various vehicle systems 140 to control the movement, speed, maneuvering, heading, direction, etc. of the vehicle 100. The processor(s) 110, the safety system 170, and/or the autonomous driving module(s) 160 may control some or all of these vehicle systems 140.

The processor(s) 110, the safety system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the safety system 170, and/or the autonomous driving module(s) 160 can control the direction and/or speed of the vehicle 100. The processor(s) 110, the safety system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the safety system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for playing video in a vehicle comprising:
one or more processors;
a memory communicably coupled to the one or more processors and storing:
a video module including instructions that when executed by the one or more processors cause the one or more processors to:
receive a first request to play a video on a display inside of the vehicle;
in response to the first request, play the video on the display inside of the vehicle;
start a first timer having a first duration;
determine that the first timer has expired;
in response to determining that the first timer has expired, stop the video from playing on the display inside of the vehicle;
receive a second request to play the video on the display inside of the vehicle;
in response to the second request, play the video on the display inside of the vehicle;
start a second timer having a second duration;
determine that the second timer has expired; and
in response to determining that the second timer has expired, stop the video from playing on the display inside of the vehicle.

2. The system of claim 1, wherein the video module further includes instructions that when executed by the one or more processors cause the one or more processors to:
receive a third request to play the video on the display inside of the vehicle; and
in response to the third request, reject the third request to play the video on the display inside of the vehicle.

3. The system of claim 1, wherein the video module further includes instructions that when executed by the one or more processors cause the one or more processors to:
display an indication that the video cannot be played.

4. The system of claim 1, wherein the first duration is greater than the second duration.

5. The system of claim 1, wherein the video module further includes instructions that when executed by the one or more processors cause the one or more processors to:
determine a speed of the vehicle;
determine that the speed is greater than a threshold speed; and
start the first timer and the second timer only when the determined speed is greater than the threshold speed.

6. The system of claim 1, wherein the video is streamed from a camera associated with the vehicle.

7. The system of claim 1, wherein the video module further includes instructions that when executed by the one or more processors cause the one or more processors to:
receive a selection of a camera of a plurality of cameras associated with the vehicle; and
play video associated with the selected camera on the display inside of the vehicle.

8. The system of claim 1, wherein the video module further includes instructions that when executed by the one or more processors cause the one or more processors to:
determine a default camera of a plurality of cameras associated with the vehicle; and
play video associated with the default camera on the display inside of the vehicle.

9. A method for playing video in a vehicle, the method comprising:
receiving a first request to play a video on a display inside of the vehicle;
in response to the first request, playing the video on the display inside of the vehicle;
starting a first timer having a first duration;
determining that the first timer has expired;

in response to determining that the first timer has expired, stopping the video from playing on the display inside of the vehicle;
receiving a second request to play the video on the display inside of the vehicle;
in response to the second request, playing the video on the display inside of the vehicle;
starting a second timer having a second duration;
determining that the second timer has expired; and
in response to determining that the second timer has expired, stopping the video from playing on the display inside of the vehicle.

10. The method of claim 9, further comprising:
receiving a third request to play the video on the display inside of the vehicle; and
in response to the third request, rejecting the third request to play the video on the display inside of the vehicle.

11. The method of claim 10, further comprising displaying an indication that the video cannot be played.

12. The method of claim 9, wherein the first duration is greater than the second duration.

13. The method of claim 9, further comprising:
determining a speed of the vehicle;
determining that the speed is greater than a threshold speed; and
starting the first timer and the second timer only when the determined speed is greater than the threshold speed.

14. The method of claim 9, wherein the video is streamed from a camera associated with the vehicle.

15. The method of claim 9, further comprising receiving a selection of a camera of a plurality of cameras associated with the vehicle, and playing video associated with the selected camera on the display inside of the vehicle.

16. The method of claim 9, further comprising:
determining a default camera of a plurality of cameras associated with the vehicle; and
playing video associated with the default camera on the display associated with the vehicle.

17. The method of claim 9, further comprising:
determining a speed of the vehicle; and
setting the first duration based on the determined speed.

18. A non-transitory computer-readable medium for playing video in a vehicle including instructions that when executed by one or more processors cause the one or more processors to:
receive a first request to play a video on a display inside of the vehicle;
in response to the first request, play the video on the display inside of the vehicle;
start a first timer having a first duration;
determine that the first timer has expired;
in response to determining that the first timer has expired, stop the video from playing on the display inside of the vehicle;
receive a second request to play the video on the display inside of the vehicle;
in response to the second request, play the video on the display inside of the vehicle;
start a second timer having a second duration;
determine that the second timer has expired; and
in response to determining that the second timer has expired, stop the video from playing on the display inside of the vehicle.

19. The non-transitory computer-readable medium of claim 18, further comprising instructions that when executed by one or more processors cause the one or more processors to:
receive a third request to play the video on the display inside of the vehicle; and
in response to the third request, reject the third request to play the video on the display inside of the vehicle.

20. The non-transitory computer-readable medium of claim 18, wherein the second request is received before the first timer has expired.

21. A system for playing video in a vehicle comprising:
one or more processors;
a memory communicably coupled to the one or more processors and storing:
a video module including instructions that when executed by the one or more processors cause the one or more processors to:
determine a speed of the vehicle;
determine whether the speed is greater than or less than a threshold speed;
receive a first request to play video on a display inside of the vehicle;
in response to receiving the first request and the speed being greater than the threshold speed:
play the video on the display inside of the vehicle;
start a first timer having a first duration;
determine that the first timer has expired; and
in response to determining that the first timer has expired, stop the video from playing on the display inside of the vehicle;
receive a second request to play the video on the display inside of the vehicle;
in response to receiving the second request and the speed being greater than the speed threshold:
play the video on the display inside of the vehicle;
start a second timer having a second duration;
determine that the second timer has expired; and
in response to determining that the second timer has expired, stop the video from playing on the display inside of the vehicle; and
in response to receiving the first request or the second request and the speed being less than the speed threshold:
play the video on the display inside of the vehicle without using the first timer or the second timer.

* * * * *

UNITED STATES PATENT AND TRADEMARK OFFICE
CERTIFICATE OF CORRECTION

PATENT NO. : 10,796,177 B1
APPLICATION NO. : 16/412609
DATED : October 6, 2020
INVENTOR(S) : Coh L. Yoshizaki et al.

Page 1 of 1

It is certified that error appears in the above-identified patent and that said Letters Patent is hereby corrected as shown below:

In the Claims

Claim 21, Column 20, at Line 43: "speed being greater than the speed threshold:" should read -- speed being greater than the threshold speed: --

Claim 21, Column 20, at Line 52: "speed threshold:" should read -- threshold speed: --

Signed and Sealed this
Eighth Day of December, 2020

Andrei Iancu
*Director of the United States Patent and Trademark Office*